UNITED STATES PATENT OFFICE.

WILLIAM PETERS, OF LOGANSPORT, INDIANA.

IMPROVEMENT IN AXLE-GREASE.

Specification forming part of Letters Patent No. 174,738, dated March 14, 1876; application filed February 21, 1876.

*To all whom it may concern:*

Be it known that I, WILLIAM PETERS, of Logansport, Cass county, Indiana, have invented a new and Improved Axle-Grease, of which the following is a specification:

My improved compound for axle-grease consists of twenty (20) gallons of black oil, (West Virginia car-oil,) well boiled, to which is added, after boiling, ten (10) gallons hard tallow, and thirty (30) pounds hard-wood ashes, thirty (30) pounds white lime, fifteen (15) pounds salt, fifteen (15) pounds of sulphur, and fifteen (15) pounds black lead, stirring well till cool.

The above are the proportions for thirty gallons of grease. I do not limit myself to the exact proportions stated, but may vary them to some extent.

Having thus described my invention, I claim as new and desire to secure by Letters Patent—

The compound of black oil, hard tallow, wood ashes, white lime, salt, sulphur, and black lead, substantially in the manner and proportions set forth.

WILLIAM PETERS.

Witnesses:
JOSEPH GREEN,
MICHAEL MC CARTHY.